(12) United States Patent
Yost

(10) Patent No.: US 8,999,191 B2
(45) Date of Patent: Apr. 7, 2015

(54) R22 REPLACEMENT REFRIGERANT

(71) Applicant: National Refrigerants, Inc., Philadelphia, PA (US)

(72) Inventor: Robert Yost, Wilmington, DE (US)

(73) Assignee: National Refrigerants, Inc., Philadelphia, PA (US)

( * ) Notice: Subject to any disclaimer, the term of this patent is extended or adjusted under 35 U.S.C. 154(b) by 7 days.

(21) Appl. No.: 13/837,799

(22) Filed: Mar. 15, 2013

(65) Prior Publication Data

US 2014/0264146 A1 Sep. 18, 2014

(51) Int. Cl.
*C09K 5/04* (2006.01)

(52) U.S. Cl.
CPC .............. *C09K 5/045* (2013.01); *C09K 2205/12* (2013.01); *C09K 2205/43* (2013.01)

(58) Field of Classification Search
CPC ........... C09K 2205/43; C09K 2205/12; C09K 2205/122; C09K 5/045
USPC ......................................................... 252/67
See application file for complete search history.

(56) References Cited

U.S. PATENT DOCUMENTS

| | | | |
|---|---|---|---|
| 5,185,094 A | 2/1993 | Shiflett | |
| 5,417,871 A | 5/1995 | Minor | |
| 5,458,798 A | 10/1995 | Lunger | |
| 5,616,276 A | 4/1997 | Bivens | |
| 5,624,596 A | 4/1997 | Lunger | |
| 5,635,098 A | 6/1997 | Lunger | |
| 5,643,492 A | 7/1997 | Shiflett | |
| 5,670,079 A | 9/1997 | Lunger | |
| 5,688,432 A * | 11/1997 | Pearson | 252/67 |
| 5,709,092 A | 1/1998 | Shiflett | |
| 5,736,063 A | 4/1998 | Richard | |
| 5,766,511 A | 6/1998 | Musso | |
| 5,785,883 A | 7/1998 | Minor | |
| 5,954,995 A | 9/1999 | Goble | |
| 6,001,273 A | 12/1999 | Minor | |
| 6,113,803 A | 9/2000 | Richard | |
| 6,187,219 B1 | 2/2001 | Omure | |
| 6,207,071 B1 | 3/2001 | Takigawa | |
| 6,231,780 B1 | 5/2001 | Lee | |
| 6,231,781 B1 | 5/2001 | Lee | |
| 6,428,720 B1 | 8/2002 | Roberts | |
| 6,526,764 B1 | 3/2003 | Singh | |
| 6,531,441 B1 | 3/2003 | Minor | |
| 6,606,868 B1 | 8/2003 | Powell | |
| 6,655,160 B2 * | 12/2003 | Roberts | 62/114 |
| 6,695,973 B1 | 2/2004 | Musso | |
| 6,783,691 B1 * | 8/2004 | Bivens et al. | 252/67 |
| 7,229,567 B2 | 6/2007 | Roberts | |
| 7,258,813 B2 | 8/2007 | Roberts | |
| 7,713,434 B2 | 5/2010 | Roberts | |
| 7,728,978 B2 | 6/2010 | Zhou | |
| 7,771,610 B2 | 8/2010 | Roberts | |
| 7,837,894 B2 | 11/2010 | Roberts | |
| 8,246,851 B2 * | 8/2012 | Roberts et al. | 252/68 |
| 2002/0194862 A1 | 12/2002 | Komatsubara | |
| 2008/0092648 A1 | 4/2008 | Zhou | |

FOREIGN PATENT DOCUMENTS

| | | |
|---|---|---|
| EP | 0 647 701 A1 | 4/1995 |
| EP | 0 693 546 A1 | 1/1996 |
| EP | 0 659 862 B1 | 6/1996 |
| EP | 0 779 352 B1 | 6/1997 |
| EP | 0 699 742 B1 | 5/1999 |
| EP | 1 028 152 A2 | 8/2000 |
| JP | 06 220430 | 8/1994 |
| WO | 93/15163 | 8/1993 |
| WO | 94/00529 | 1/1994 |
| WO | 9603473 A1 | 2/1996 |
| WO | 9715637 A1 | 5/1997 |
| WO | 0042118 A1 | 7/2000 |

OTHER PUBLICATIONS

Vera; "Real Case of a Retrofit on an AC System which was URNG with R-22"; http://www.fri3oilsystem.com/; Jul. 2, 2009; Barcelona, Spain.

* cited by examiner

*Primary Examiner* — John Hardee
(74) *Attorney, Agent, or Firm* — Johnson Legal PLLC

(57) ABSTRACT

Refrigerant compositions are disclosed which includes (a) 57-59 total wt % pentafluoroethane (R125); (b) 38-41 total wt % 1,1,1,2-tetrafluoroethane (R134a); and (c) 2.5-2.9 total wt % isobutane. More preferably, the invention is a refrigerant formulation containing a nominal composition consisting of 58.0% R125, 39.3% R134a and 2.7% R600a, subject only to the normal variations in concentrations experienced with charging and mixing refrigerants.

14 Claims, No Drawings

R22 REPLACEMENT REFRIGERANT

FIELD OF THE INVENTION

The present invention relates to refrigerant compositions, particularly for use as replacements in air conditioning and refrigeration equipment currently employing, or designed to employ, the refrigerant R22.

BACKGROUND OF THE INVENTION

Refrigerant R22 ($CCl_2F_2$) is widely used for residential and commercial air conditioning, as well as commercial refrigeration and has been commonly used with a mineral oil lubricant.

Driven by the 1992 amendment to the Montreal Protocol that calls for the phase-out of HCFCs, refrigerant manufacturers developed HFC alternatives. Original Equipment Manufacturers selected R404A/R507, R407C and R410A to replace R22. They found, however, that system changes were necessary for this conversion and made appropriate design changes to meet application requirements and regulatory demands.

Particular attention has been directed at blends of R134a (1,1,1,2-tetrafluoroethane) along with R125 (pentafluoroethane) as alternatives for R22 refrigerants in air conditioning and refrigeration systems. Commercial formulations of these two refrigerants also involve the use of isobutane (R600a). See, Table 1 below. See also U.S. Pat. Nos. 6,606,868 and 6,655,160 the disclosures of which are herein incorporated by reference.

TABLE 1

| Designation | Nominal Composition | | |
|---|---|---|---|
|  | R125 (%) | R134a (%) | R600a (%) |
| R-422A | 85.1 | 11.5 | 3.4 |
| R-422B | 55.0 | 42.0 | 3.0 |
| R-422C | 82.0 | 15.0 | 3.0 |
| R-422D | 65.1 | 31.5 | 3.4 |

The R422A-D refrigerants have proven to be valuable retrofit refrigerants for R22 systems because they are compatible with mineral oil lubricants. Such compatibility can make these refrigerants economically attractive retrofit options by potentially avoiding the time and expense of changing lubricant types and the attendant changes to seals and other polymeric surfaces that might have been swelled by the mineral oil.

Like many refrigerants that are designed to replace R22 refrigerants in existing equipment, the use of R422A-D refrigerants results in a significantly higher mass flow to provide the same cooling capacity as R22. Thus, the desire to use one of R422A-D to retrofit equipment designed for R22 can require the replacement of expansion devices, distributor nozzles or even line sets. Lower capacity also means longer periods of operation to achieve the same level of cooling. See Spletzer et al., "Refrigerants for R-22 Retrofits", http://www.arkema-inc.com/literature/pdf/1035.pdf (2011).

It would be desirable to have a replacement refrigerant for retrofitting R22 equipment in air conditioning and refrigeration systems that was compatible with mineral oil, like the existing R422A-D formulations, but which would exhibit a similar cooling capacity and required mass flow rate that would not necessitate replacement of the expansion devices in the system.

SUMMARY OF THE INVENTION

It is an object of the invention to provide a formulation of R125, R134a and R600a refrigerants that was compatible with mineral oil lubricants used in existing air conditioning and refrigeration equipment.

It is further an object of the invention to provide a retrofit R22 refrigerant formulation that was free of chlorine atoms and which would be compatible with the installed base of air conditioning and refrigeration equipment that was typically used for R22 air conditioning or refrigeration systems.

In accordance with these and other objects of the invention that will become apparent from the more detailed description provided herein, a refrigerant formulation according to the invention comprises a nominal composition of: (a) 57-59 total wt % pentafluoroethane (R125); (b) 38-41 total wt % 1,1,1, 2-tetrafluoroethane (R134a); and (c) 2.5-3.0 total wt % isobutane. Preferably, the nominal composition of the refrigerant blend according to the invention consists of 58.0 wt % R125, 39.3 wt % R134a, and 2.7 wt % R600a.

Also according to the invention is a method for upgrading an existing R22 air conditioning or refrigeration unit using a mineral oil lubricant to eliminate the R22 refrigerant by a method that comprises: replacing said R22 refrigerant from said unit with a refrigerant formulation having a nominal charge concentration consisting of (a) 57-59 total wt % pentafluoroethane (R125); (b) 38-41 total wt % 1,1,1,2-tetrafluoroethane (R134a); and (c) 2.5-3.0 total wt % isobutane (R600a). Preferably, the nominal composition of the refrigerant blend according to the invention consists of 58.0 wt % R125, 39.3 wt % R134a, and 2.7 wt % R600a.

The formulation according to and used in the present invention works well in existing R22 air conditioning and refrigeration systems that use mineral oil lubricants. This formulation, the inventor has determined, is sufficient to operate in what he found to be the majority of the existing R22 air conditioning and refrigeration equipment that is used today with only minor adjustments. The present invention thus provides an R22 retrofit refrigerant that is compatible with existing mineral oil lubricants and does not require replacement of the expansion devices in the legacy system.

DETAILED DESCRIPTION OF THE INVENTION

The present invention is a formulation containing three refrigerants, pentafluoroethane (R125), 1,1,1,2-tetrafluoroethane (R134a) and isobutane (R600a) in specified portions. The inventor has determined that a formulation containing a nominal composition of (a) 57-59 total wt % pentafluoroethane (R125); (b) 38-41 total wt % 1,1,1,2-tetrafluoroethane (R134a); and (c) 2.5-3.0 total wt % isobutane (R600a) exhibits a unique set of properties that make it well suited to replace R22 refrigerants in the existing air conditioning and refrigeration equipment that was originally designed for use with R22 refrigerants. More preferably, the invention is a refrigerant formulation containing a nominal composition consisting of 58.0% R125, 39.3% R134a and 2.7% R600a, subject only to the normal variations in concentrations experienced with charging and mixing refrigerants.

A bit of refrigeration history is useful to help understand how the present invention came to be and why it works as well as it does. Legacy R-22 cooling systems were all designed and constructed so that all the components work together in balance to make a matched system that meets the desired seasonal energy efficiency ratio (SEER) at the lowest manufacturing cost. The heat absorbed by the evaporator is transported to the condenser using the refrigerant pumped through the system by the compressor. The expansion device is sized to work with the above components to regulate the flow of refrigerant through the system so all the other components are operating correctly. The matching process is so closely linked that only R22 refrigerant will make the system operate properly. The use of a different refrigerant has often prompted the need to replace one or more pieces of the hardware in the system as well as its lubricant.

There are standard conditions to rate the performance of residential air conditioning systems. AHRI Standard 210/240 describes the conditions to run HVAC systems at to get the SEER (Seasonal Energy Efficiency Ratio) value used to compare the energy efficiency and rate the cooling capacity of the systems. This standard is for the purpose of allowing consumers to get a fair comparison of the systems prior to purchasing, and for the government to establish minimum efficiency requirements for new HVAC systems.

The AHRI 210/240 standard uses several different temperatures to derive the "Seasonal" component of the rating. The highest ambient air temperature used in the AHRI 210/240 standard is 95° F. (35° C.), and this may result in condensing temperatures for the refrigerant inside the condenser of between 105 and 110° F. (40° to 43° C.) because the refrigerant inside the system has to be warmer than the outside air temperature in order for the heat to move from the refrigerant to the outside air. Conventional operation conditions for the legacy R22 systems include these standards and their conditions.

Each of the components of the cooling system is sensitive to the composition and amount of refrigerant flowing through it, and the legacy R22 systems are no exception. Large changes in refrigerant flow rate as compared to the designed flow rates will cause the amount of heat absorbed by the system to change adversely. For example, if the refrigerant absorbs too much heat from the evaporator because the expansion device cannot adequately slow down the flow rate of refrigerant, the compressor will pump too much refrigerant and overload the electric motor which could either trigger associated electrical protection circuits or permanently damage the motor. On the other hand, if the refrigerant absorbs too little heat because the expansion device cannot pass enough refrigerant, the system will lose the ability to absorb enough heat to keep the cooled area at the selected temperature.

Fortunately, legacy refrigeration systems were all designed at a time when there were far fewer refrigerants and lubricant options. This fact caused design engineers to use substantially the same refrigerant and lubrication performance criteria when specifying the expansion devices, motors, etc. that were used in these legacy systems. As a result, those systems tended to be fairly close in terms of the tolerable range of adjustments that each could employ and still achieve acceptable performance. The present invention is specifically designed to be a retrofit refrigerant for R22 systems that can be used in the legacy R22 equipment with the legacy mineral oil lubricants. This latter property thus eliminates the need to replace the existing lubricant for a polyol ester or alkylbenzene lubricant and avoids the introduction of a lubricant solvent that can dislodge debris deposits in older systems and absorb ambient moisture more readily.

The R422-type formulation according to the invention exhibits cooling and condensation properties that make it well suited as a retrofit for R22 refrigerants without the need to replace the expansion devices and flow valves of the existing legacy equipment. Specifically, the inventor has found that the existing flow control devices in legacy equipment for R22 refrigeration systems has the ability to deliver the correct refrigerant flow rate if the mass flow of the replacement refrigerant is within about 30 wt/wt % of the original R22 refrigerant. The refrigerant formulation of the invention exhibits cooling capacities and mass flow rates that are within the flow adjustment tolerances of such equipment. Thus, the refrigerant formulation of the present invention can replace the legacy R22 refrigerant using the same lubricant and the same expansion valves with only adjustments that are within acceptable ranges of such legacy equipment.

EXAMPLES

Example 1

A preferred refrigerant composition according to the invention having a nominal composition of R125:R134a:R600a of 58.0:39.3:2.7 (wt) was prepared and tested with the modeling program called the "NIST Reference Fluid Thermodynamic and Transport Properties Database" (REFPROP), version 9.0, obtained from the National Institute of Standards and Technology (NIST) at http://www.nist.gov/srd/nist23.cfm. The conditions were set at the more conventional operating conditions of 105° F. condenser, 40° F. evaporator, 9° F. subcooling temperature, 10° F. superheat and 58° F. compressor inlet temperature that are seen in actual use with R22 systems. The results are shown below in Table 2.

TABLE 2

| Refrigerant | Cooling Capacity Relative to R-22 (A) | Mass Flow Relative to R-22 (B) | Performance Factor (A × B) |
|---|---|---|---|
| R-22 | 100% | 100% | 1.000 |
| R-422A | 102% | 164%* | 1.673 |
| R-422B | 88%* | 118% | 1.038 |
| R-422C | 100% | 158%* | 1.580 |
| R-422D | 93% | 131%* | 1.218 |
| Invention | 90% | 123% | 1.107 |

*Denotes performance outside acceptable adjustment ranges of legacy equipment

As shown in Table 2, the refrigerant formulation according to the invention exhibits a cooling capacity of 90% that of R22 refrigerant and would require a mass flow rate of 123% that of R22 refrigerant to operate in substantially the same manner as the legacy R22 refrigerant under the exemplified conditions. As noted above, these exemplified conditions are representative of typical conditions for the operation of R22 refrigeration systems. These parameters are, however, within the existing scope of adjustment for the vast majority of the expansion valves and compressor adjustments that are available in legacy R22 air conditioning and refrigeration systems.

The minimum cooling capacity of 90% at the exemplified conditions is important for the invention because the R-422B refrigerant has 2% less cooling capacity. This difference, though seemingly small, can determine whether the system is able to cool the building to the desired temperature.

Consideration of both the cooling capacity and the Performance Factor together show the value of the present refrigerant blend as a replacement for R22 refrigerants in legacy R22 equipment. The Performance Factor should be above 1.00 but less than 1.20, preferably less than 1.15 and even more preferably less than 1.12 at the conditions used in Example 1 while the Cooling Capacity of the refrigerant blend is 90% or greater at the same conditions. This combination of performance measurements reflects a replacement for R22 refrigerant that will work in the legacy equipment, with only adjustment, yet operate at the desired cooling capacity with mineral oil lubricant.

Example 2

In example 2, the present invention was compared by modeling with the REFPROP program noted above against refrigerants R422A-D and a formulation listed in Table 2 of U.S. Pat. No. 6,655,160 having 59.4% R125, 39.6% R134a and 1.0% R600a using the more severe conditions listed in the Experimental Method section of U.S. Pat. No. 6,655,160 ("the '160 patent"): evaporating temperature of 0° C., condensing temperature of 40° C. and superheat of 8 k. These conditions are not typical of those used with R22 air conditioning or refrigeration systems. The results are shown in Table 3.

TABLE 3

| Refrigerant | Capacity* @ 6 cfm | Relative to R22 (A) | Mass Flow | Relative to R22 (B) | Performance Factor (A × B) |
|---|---|---|---|---|---|
| R22 | 32200 | 100% | 447 | 100% | 1.000 |
| '160 Patent | 27850 | 86% | 544 | 121.70% | 1.047 |
| R422B | 27550 | 86% | 526 | 117.67% | 1.012 |
| R422D | 29050 | 90% | 585 | 130.87% | 1.178 |
| Invention | 27950 | 87% | 542 | 121.25% | 1.055 |

*Heat extraction rate or duty

The R422D refrigerant, as shown in Table 3 above, requires a higher mass flow rate relative to R22 and may result in unacceptable cooling performance because the legacy expansion valve cannot be adjusted sufficiently because the mass flow needed for acceptable performance is too much greater than where the valve was originally designed to work with R22. In other words, the valve will not be able to open up enough to feed the desired amount of R422D into the evaporator. The legacy system would lose cooling capacity and could no longer cool the room or building down to the previously set temperature and would only be able to maintain a somewhat higher temperature than the desired set point if stressed by an increased environmental load like a hot, sunny day or a crowd of people in the same room.

The lower cooling capacities of R422B and the refrigerant from the '160 patent from the modeling tests that are reflected in Table 3 mean that these refrigerants will not have the ability to remove as much heat from the room or building that is being cooled by the system.

In contrast, the increased capacity of the refrigerant of the present invention will result in shorter run times for the compressor, quicker cooling of the room or building, or a lower ultimate temperature in the room or building being cooled.

What is claimed is:

1. A refrigerant composition exhibiting a nominal composition which comprises: (a) 57-59 total wt % pentafluoroethane (R125); (b) 38-41 total wt % 1,1,1,2-tetrafluoroethane (R134a); and (c) 2.5-3.0 total wt % isobutane (R600a).

2. A refrigerant composition according to claim 1 comprising a zeotrope having a nominal composition of: (a) 58.0 total wt % pentafluoroethane (R125); (b) 39.3 total wt % 1,1,1,2-tetrafluoroethane (R134a); and (c) 2.7 total wt % isobutane (R600a).

3. A refrigerant composition according to claim 1 further comprising a mineral oil lubricant.

4. A refrigerant according to claim 1 exhibiting a cooling capacity relative to R22 refrigerant that is at least 90% at conventional operating conditions for an R22 refrigeration system.

5. A refrigerant according to claim 4 wherein said composition further exhibits a performance factor relative to R22 refrigerant that is more than 1.00 but less than 1.20.

6. A refrigerant according to claim 5 exhibiting a performance factor relative to R22 refrigerant that is more than 1.00 but less than 1.15.

7. A refrigerant according to claim 1 exhibiting a performance factor relative to R22 refrigerant that is more than 1.00 but less than 1.20 at conventional operating conditions for an R22 refrigeration system.

8. A refrigerant according to claim 7 exhibiting a performance factor relative to R22 refrigerant that is more than 1.00 but less than 1.12.

9. A method for upgrading an existing R22 refrigeration unit using a mineral oil lubricant to eliminate the R22 refrigerant by a method that comprises:
   replacing said R22 refrigerant from said refrigeration unit with a refrigerant formulation with a nominal composition consisting of (a) 57-59 total wt % pentafluoroethane (R125); (b) 38-41 total wt % 1,1,1,2-tetrafluoroethane (R134a); and (c) 2.5-3.0 total wt % isobutane (R600a).

10. A method according to claim 9 wherein said method comprises replacing said R22 refrigerant from said refrigeration unit with a refrigerant formulation having a nominal composition consisting of (a) 58.0 total wt % pentafluoroethane (R125); (b) 39.3 total wt % 1,1,1,2-tetrafluoroethane (R134a); and (c) 2.7 total wt % isobutane (R600a).

11. A method according to claim 9 wherein said refrigerant formulation exhibits a performance factor relative to R22 refrigerant that is more than 1.00 but less than 1.20 at conventional operating conditions for an R22 refrigeration system.

12. A method according to claim 11 wherein said refrigerant formulation exhibits a performance factor relative to R22 refrigerant that is more than 1.00 but less than 1.15.

13. A method according to claim 12 wherein said refrigerant formulation exhibits a performance factor relative to R22 refrigerant that is more than 1.00 but less than 1.12.

14. A method according to claim 13 wherein said refrigerant formulation further exhibits a cooling capacity relative to R22 refrigerant that is at least 90%.

* * * * *